United States Patent
Mohr et al.

(10) Patent No.: US 6,497,748 B2
(45) Date of Patent: Dec. 24, 2002

(54) METHOD AND APPARATUS FOR REMOVING NON-CONDENSIBLE GAS FROM A WORKING FLUID IN A BINARY POWER SYSTEM

(75) Inventors: Charles M. Mohr, Idaho Falls, ID (US); Gregory L. Mines, Idaho Falls, ID (US); K. Kit Bloomfield, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/860,280

(22) Filed: May 17, 2001

(65) Prior Publication Data
US 2002/0007732 A1 Jan. 24, 2002

Related U.S. Application Data
(60) Provisional application No. 60/204,939, filed on May 17, 2000.

(51) Int. Cl.$^7$ .............................................. B01D 53/22
(52) U.S. Cl. ........................ 95/45; 96/4; 96/14
(58) Field of Search ......................... 95/45–47, 50, 95/54; 96/4, 9, 13, 14

(56) References Cited

U.S. PATENT DOCUMENTS

| | | | | |
|---|---|---|---|---|
| 4,171,017 A | * | 10/1979 | Klass | 95/50 X |
| 4,824,447 A | * | 4/1989 | Goldsberry | 96/9 |
| 5,089,033 A | * | 2/1992 | Wijmans | 95/50 X |
| 5,281,255 A | * | 1/1994 | Toy et al. | 95/50 |
| 5,762,685 A | * | 6/1998 | Baker et al. | 95/50 X |
| 5,772,734 A | * | 6/1998 | Baker et al. | 95/50 X |
| 5,964,923 A | * | 10/1999 | Lokhandwala | 95/50 |
| 6,035,641 A | * | 3/2000 | Lokhandwala | 95/50 X |
| 6,159,272 A | * | 12/2000 | Baker et al. | 95/50 X |
| 6,221,131 B1 | * | 4/2001 | Behling et al. | 95/50 |
| 6,228,146 B1 | * | 5/2001 | Kuespert | 95/46 |

* cited by examiner

Primary Examiner—Robert H. Spitzer
(74) Attorney, Agent, or Firm—Dahl & Osterloth (57) ABSTRACT

Apparatus for removing non-condensible gas from a working fluid utilized in a thermodynamic system comprises a membrane having an upstream side operatively connected to the thermodynamic system so that the upstream side of the membrane receives a portion of the working fluid. The first membrane separates the non-condensible gas from the working fluid. A pump operatively associated with the membrane causes the portion of the working fluid to contact the membrane and to be returned to the thermodynamic system.

21 Claims, 2 Drawing Sheets

METHOD AND APPARATUS FOR REMOVING NON-CONDENSIBLE GAS FROM A WORKING FLUID IN A BINARY POWER SYSTEM

RELATED APPLICATIONS

This application claims priority to U.S. Provisional Patent Ser. No. 60/204,939 filed May 17, 2000 and is incorporated herein.

CONTRACTUAL ORIGIN OF THE INVENTION

This invention was made with United States Government support under Contract No. DE-AC07-99ID13727 awarded by the United States Department of Energy. The United States Government has certain rights in the invention.

FIELD OF THE INVENTION

This invention relates generally to power generation systems in general and more specifically geothermal power generation systems.

BACKGROUND OF THE INVENTION

Power generation systems or power plants are well-known in the art and are widely used to produce useful work (e.g., electricity) from heat sources. Most such power generation systems generate electricity from heat energy derived from burning fossil fuels (e.g., coal or natural gas) and are referred to herein as thermal power plants. In addition to using heat energy derived from burning fossil fuels, thermal power plants can also be used with a wide variety of other heat sources, such as solar, geothermal, and nuclear sources.

Traditionally, thermal power plants have operated in accordance with the well-known Rankine thermodynamic cycle, although other cycles are known and are being used. In the Rankine cycle, a working fluid, such as water, is heated to produce steam. The steam is then expanded, typically through a turbine, in order to convert into mechanical work the heat energy contained in the working fluid. In the case of an electric power generation system, the turbine is operatively connected to an electrical generator which produces the electricity. While power plants operating in accordance with the Rankine cycle typically use water as the working fluid, other types of working fluids are known and may be better suited to the particular type of heat source utilized and the thermodynamic cycle of the system.

For example, in a geothermal power system, useful work (e.g., electricity) is extracted from heat energy contained in geothermal brine extracted from the earth. While geothermal power generation systems have been constructed that utilize the geothermal brine as the working fluid (i.e., in a "direct flash" type of geothermal system), it is sometimes advantageous to utilize a so-called "binary" system in which the heat from the geothermal brine is transferred to a recirculating working fluid. The recirculating working fluid is then used to drive the energy conversion device (e.g., the turbine). The use of a separate, recirculating working fluid dispenses with the need to design the turbine to operate with the geothermal brine.

In a binary type geothermal power generation system, a vapor generator system (e.g., a heat exchanger) receives the hot geothermal brine and allows the heat energy contained therein to heat and vaporize the recirculating working fluid. The vaporized working fluid is then expanded through the turbine to produce useful work. The working fluid exhaust stream from the turbine is then condensed, e.g., converted back into a liquid. Thereafter, the condensed working fluid is re-circulated to the vapor generator, whereupon it is re-vaporized and again expanded through the turbine.

While the working fluid for such a binary geothermal power system may comprise water, it is generally preferable to use a working fluid that comprises a volatile organic compound (VOC), such as isobutane or isopentane. Such VOC working fluids are generally better suited for use with the pressure and temperature regimes associated with geothermal power generation systems.

However, regardless of the particular type of working fluid that is utilized, one problem associated with power generation systems in general and geothermal power generation systems in particular, relates to the accumulation of so-called non-condensible gases (NCGs) in the working fluid. Such gases are referred to as "non-condensible" since they do not condense at the temperatures and pressures at which the working fluid is condensed. That is, the condensation of the working fluid in the condenser system generally does not result in the condensation of the NCGs. In a system utilizing a VOC working fluid, such non-condensible gases typically comprise air and can come from a variety of sources, including the turbine lubricant treatment and recycle system, impurities in the working fluid, air introduced during system repairs, as well as from small leaks which may be present in the system.

While the accumulation of NCGs does not pose a serious problem in the high pressure side of the power generation system (e.g., in the vapor generator and turbine systems) in which is used the working fluid, they can cause problems in the low pressure side of the system, particularly in the condenser. More specifically, the non-condensible gases (NCGs) tend to accumulate at the vapor/liquid interface in the condenser, restricting the movement of the vapor stream to the vapor/liquid interface and lowering the partial pressure of the vapor at the vapor/liquid interface. The result is a decreased heat transfer coefficient in the condenser system and a higher condenser pressure, both of which adversely affect the overall efficiency of the system and result in reduced power output.

Standard practice in binary type geothermal power plants is to allow the NCGs to accumulate until an unacceptable level is reached. The working fluid vapor is vented and the NCGs removed in a batch process. The purified working fluid is then returned to the system. While this practice is effective from a functional standpoint, it is less than ideal in that the efficiency of the power generation system is continuously reduced until such time as the accumulated NCGs are removed from the system. Then, as the NCGs again accumulate, the efficiency of the system is again gradually reduced until the NCGs are again removed or purged from the system. Depending on the specific power generation system, the gradual accumulation and periodic purging of NCGs can reduce annual production by as much as 2 to 4 percent.

SUMMARY OF THE INVENTION

Apparatus for removing non-condensible gas from a working fluid utilized in a thermodynamic system may comprise a membrane having an upstream side operatively connected to the thermodynamic system so that the upstream side of the membrane receives a portion of the working fluid. The first membrane separates the non-condensible gas from the working fluid. A pump operatively associated with the membrane causes the portion of the working fluid to contact the membrane.

Also disclosed is a method for removing non-condensible gases from a working fluid utilized in a thermodynamic system that comprises continually separating non-condensible gas from the working fluid during operation of the thermodynamic system. The step of continually separating the non-condensible gas from the working fluid may comprise the steps of contacting with a membrane a portion of the working fluid in a vapor state, the membrane separating the non-condensible gas from the working fluid in the vapor state; and returning to the thermodynamic system the working fluid separated from the non-condensible gas.

BRIEF DESCRIPTION OF THE DRAWINGS

Illustrative and presently preferred embodiments of the invention are shown in the accompanying drawing in which.

DETAILED DESCRIPTION OF THE INVENTION

Figure 1:
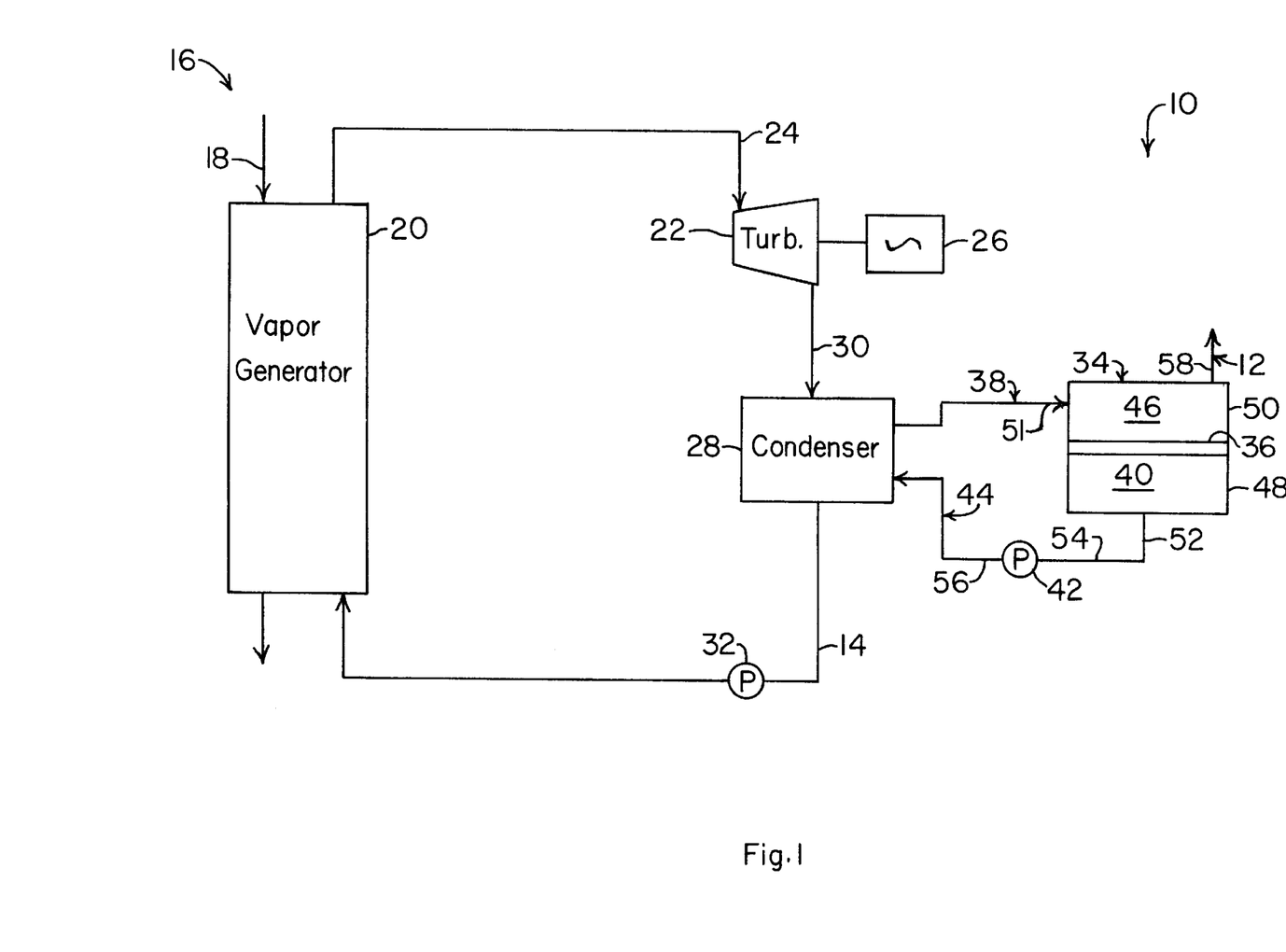
FIG. 1 is a schematic representation of a first embodiment of the apparatus for removing non-condensible vapors as it could be used in conjunction with a binary geothermal power generation system.

Apparatus 10 for removing non-condensible gas 12 from a working fluid 14 is shown and described herein as it could be used with a binary geothermal power generation system 16. The binary geothermal power generation system produces electricity from heat energy extracted from geothermal brine 18. Alternatively, and as will be described in greater detail below, the apparatus 10 according to the present invention may be utilized in conjunction with other types of thermodynamic systems (e.g., thermal power plants) to remove non-condensible gases from the working fluids of such systems.

Referring now primarily to FIG. 1, the geothermal power generation system 16 may comprise a vapor generator system 20 through which is caused to flow the heating fluid (e.g., geothermal brine 18) as well as the working fluid 14. An energy conversion device, such as a turbine system 22, connected to the vapor generator system 20 receives a vaporized working fluid stream 24 from the vapor generator system 20 and converts into mechanical work a portion of the heat energy contained in the vaporized working fluid stream 24. A generator system 26 connected to the turbine system 22 converts into electrical work the mechanical work of the turbine system 22. A condenser system 28 operatively associated with the turbine system 22 receives an expanded working fluid stream 30 from the turbine system 22 and condenses the expanded working fluid stream 30. A pump 32 returns the now liquefied working fluid 14 to the vapor generator system 20, whereupon the cycle is repeated.

The apparatus 10 for removing non-condensible gas 12 from the working fluid 14 is operatively associated with the geothermal power generation system 16 and operates to continuously remove accumulated non-condensible gases 12 from the working fluid 14 during the normal operation of the geothermal power generation system 16. More specifically, in the embodiment shown and described herein, the apparatus 10 comprises a housing or module 34 within which is disposed a membrane 36. The membrane 36 is operatively associated with the condenser system 28 and receives a portion of the working fluid 14 contained within the condenser system 28. The membrane 36 separates the non-condensible gas 12 from the working fluid 14 and returns the purified working fluid to the condenser system 28.

In one preferred embodiment, the membrane 36 preferentially passes the working fluid 14. Accordingly, working fluid 14 contained in an NCG-laden stream 38 from the condenser 28 passes through the membrane 36, becoming a purified working fluid or permeate 40. It will be understood by persons having ordinary skill in the art that the purified working fluid permeate 40 may, and usually will, comprise residual amounts of non-condensible gas. A pump 42 operatively associated with the membrane housing or module 34 receives the working fluid-rich permeate 40 and returns it to the condenser 28 as a "purified" working fluid stream 44. Thereafter, the purified working fluid stream 44 is condensed and re-used by the binary power generation system 16. The non-condensible gases 12 do not readily pass through the membrane 36 and comprise a retentate 46. The retentate 46 includes substantial quantities of the non-condensible gases 12. The retentate 46 may, and usually will, include residual amounts of the working fluid 14. The retentate 46 is ultimately discharged from the housing or module 34.

The apparatus 10 may be operated as follows in order to remove non-condensible gases (NCGs) 12 from the working fluid 14 utilized in the geothermal power generation system 16. Assuming that the geothermal power generation system 16 has reached steady state operation, the working fluid 14 enters the vapor generator system 20 as a liquid. Hot brine 18 flowing through the vapor generator 20 heats and ultimately vaporizes the working fluid 14. The vaporized working fluid 14 is then discharged from the vapor generator 20 as a vaporized working fluid stream 24. The vaporized working fluid stream 24 is directed to the energy conversion device, e.g., the turbine 22, which converts into useful work some of the heat energy contained in the vaporized working fluid stream 24. In the application shown and described herein, the turbine 22 is operatively associated with a generator system 26 which converts the rotational energy of the turbine 22 into electrical energy.

After being expanded in the turbine assembly 22, the working fluid 14 exits the turbine 22 as an exhaust stream 30. Generally speaking, the exhaust stream 30 discharged by the turbine system 22 will comprise a superheated vapor. That is, the exhaust stream 30 will comprise the working fluid 14 in a vapor state. The vapor state working fluid exhaust stream 30 enters the condenser system 28 which condenses the working fluid 14. Thereafter, the pump 32 receives the now liquefied working fluid 14, increases its pressure, and returns the liquified working fluid 14 to the vapor generator system 20, whereupon the cycle is repeated.

While the turbine exhaust stream 30 is in the condenser 28, a portion of the working fluid 14 (preferably while still in the vapor state) is drawn from the condenser system 28 by the apparatus 10 as the NCG-laden working fluid stream 38. The NCG-laden working fluid stream 38 comprises working fluid 14 as well as quantities of non-condensible gases (NCGs) 12. The NCG-laden working fluid stream 38 is caused to be drawn from the condenser system 28 by the action of the pump 42 which lowers the pressure on a downstream or outlet side 48 of the housing or module 34. Accordingly, the NCG-laden working fluid stream 38 drawn from the condenser system 28 enters the upstream or inlet side 50 of the housing 34, whereupon the NCG-laden working fluid contacts the membrane 36. Since the membrane 36 preferentially passes the working fluid 14, substantial quantities of the working fluid 14 contained in the NCG-laden working fluid stream 38 pass through the membrane 36, forming the working fluid-rich permeate 40 within the downstream or outlet side 48 of housing 34. The working fluid-rich permeate 40 may, and usually will, include residual amounts of NCGs 12. The pump 42 returns the working fluid rich permeate 40 to the condenser system 28, whereupon the working fluid 14 comprising the permeate 40 is ultimately condensed and returned to the system 16.

The non-condensible gases 12 contained in the NCG-laden working fluid stream 38 tends to remain on the upstream or inlet side 50 of the housing 34, forming a retentate 46. The retentate 46 will usually include residual amounts of working fluid 14. The non-condensible gases 12 comprising the retentate 46 are then discharged from the upstream side 50 of housing 34.

A significant advantage of the present invention is that it continuously removes the NCGs 12 from the working fluid 14, thereby preventing the gradual accumulation of NCGs from adversely affecting plant efficiency. Another advantage of the invention is that it eliminates the need to periodically purge the system of accumulated NCGs, which can interfere with the operation of the power generation system and increase operational costs. The present invention also reduces the quantity of make-up working fluid required to be periodically added to the system and also reduces the amount of working fluid vented to the atmosphere.

Still yet another advantage of the present invention is that it requires few components and can be readily and inexpensively implemented to new or existing power generation systems. The system also consumes little energy, thereby minimizing the adverse impact on the overall system efficiency.

Having briefly described one embodiment of the method and apparatus according to the present invention, as well as some of its more significant features and advantages, the various embodiments of the method and apparatus for removing non-condensible gases from a working fluid will now be discussed in detail. However, before proceeding with the description, it should be noted that while the method and apparatus according to the present invention are shown and described herein as they could be used in a geothermal electrical generating system utilizing hot brine as the heating fluid, the method and apparatus of the present invention are not limited to use in geothermal electrical generating systems. In fact, the method and apparatus of the present invention could be used with any of a wide variety of heating fluids and in any of a wide range of thermodynamic cycles and systems that are now known in the art or that may be developed in the future, as would be obvious to persons having ordinary skill in the art after having become familiar with the teachings of the present invention. Consequently, the method and apparatus of the present invention should not be regarded as limited to the particular applications and/or heating and working fluids shown and described herein.

With the foregoing considerations in mind, one embodiment 10 of an apparatus for removing non-condensible gases 12 from a working fluid 14 according to the present invention is shown and described herein as it could be used in a geothermal power generation system 16 which generates electrical power from a flow of hot brine 18, which serves as the heating fluid. Alternatively, other types of heating fluids may also be used. The working fluid 14 used in one embodiment of the power generation system 16 may comprise any of a wide range of volatile organic compounds (VOCs) that are now known in the art or that may be developed in the future that are or would be suitable for use as a working fluid in the particular system. Examples of such volatile organic compounds which may be used as the working fluid 14 include, without limitation, isobutane and isopentane.

As mentioned above, the geothermal power generation system 16 may comprise any of a wide range of geothermal power generation systems that are well-known in the art or that may be developed in the future. However, for the purposes of providing a background against which to describe the present invention, the basic elements of a typical geothermal power generation system 16 will now be briefly described.

Referring now to FIG. 1, a typical geothermal power generation system 16 may comprise a vapor generator system 20 through which is caused to flow the hot brine 18 (i.e., the heating fluid) as well as the working fluid 14. The vapor generator system 20 functions as a heat exchanger, allowing heat energy contained in the hot brine 18 to be transferred to the working fluid 14. The arrangement is such that sufficient heat energy is transferred to the working fluid 14 to cause the working fluid 14 to be vaporized. The vaporized working fluid 14 is thereafter discharged by the vapor generator system 20 as a vaporized working fluid stream 24. Depending on the particular system, the vaporized working fluid stream 24 may be discharged as a saturated vapor (i.e., at a quality of about 100%). Alternatively, the vaporized working fluid stream 24 may comprise a superheated vapor stream, i.e., a vapor stream having a temperature that is greater than the saturation temperature of the working fluid at the particular pressure involved.

Regardless of whether the vaporized working fluid stream 24 comprises a saturated vapor or a superheated vapor, the vaporized working fluid stream 24 from the vapor generator system 20 is directed to a suitable energy conversion device, such as a turbine system 22. The turbine system 22 converts into useful work a portion of the heat energy contained in the vaporized fluid stream 24. In the case of an electric power generation system, a generator system 26 connected to the turbine system 22 converts into electrical work the mechanical work of the turbine system 22.

After being expanded in the turbine system 22, the working fluid 14 is discharged from the turbine system 22 as an exhaust stream 30. In most applications, the working fluid 14 comprising the exhaust stream 30 will comprise a superheated vapor. That is, the working fluid 14 exiting the turbine 22 will be in the vapor state. Alternatively, other systems are available wherein the working fluid exits the turbine system 22 as a wet mixture. That is, the quality of the working fluid will be less than 100%. In any event, the turbine exhaust stream 30 is conducted to a condenser system 28 which condenses the expanded working fluid stream 30. A pump 32 returns the now liquefied working fluid 14 to the vapor generator system 20, whereupon the cycle is repeated.

It is generally preferred, but not required, that the apparatus 10 for removing non-condensible gases 12 from the working fluid 14 be operatively associated with the power generation system 16 so that the apparatus 10 receives at least a portion of the working fluid 14 in the vapor state. The reason for this requirement is that the membrane 36 generally operates more efficiently with materials in the vapor state as opposed to materials in the wet mixture state. Alternatively, if the working fluid 14 is drawn from a point where it comprises a wet mixture state, i.e., at a quality less than about 100%, then it will be advantageous to separate the vapor portion of the working fluid 14 from the liquid portion of the working fluid 14 in order to ensure that the apparatus 10 receives the working fluid 14 while in the vapor state. It is also generally preferred, but not required, that the working fluid in the vapor state be received at as low a pressure as possible to minimize the strength and pressure holding requirements of the various components comprising the apparatus 10.

In accordance with the foregoing preferences, the apparatus 10 in one embodiment of the present invention is operatively associated with the condenser system 28 and draws-off a small quantity of the working fluid in the vapor state before returning the "purified" or working fluid-rich stream to the condenser system 28. Alternatively, and as mentioned above, if the point at which the working fluid 14 is removed from the condenser system 28 is such that the working fluid 14 is in the wet mixture state, then it will be preferable to position a moisture separator (not shown) between the condenser system 28 and the apparatus 10 to ensure that the apparatus 10 receives the working fluid 14 substantially in the vapor state.

With regard to the specific embodiment shown and described herein, the apparatus 10 may comprise a housing or chamber 34 having an inlet 51 and a permeate outlet 52. The inlet 51 of housing 34 is connected to the condenser system 28 so that a portion of the working fluid 14 contained in the condenser system 28 may be conducted to the housing or chamber 34. The permeate outlet 52 of housing 34 is connected to the inlet 54 of pump 42. The outlet 56 of pump 42 is connected to the condenser system 28 so that the purified working fluid stream 44 from the apparatus 10 may be returned to the power generation system 16. Alternatively, the pump 42 may be located in the inlet line to the housing 34, although this is not generally preferred. The housing 34 may also be provided with a retentate outlet 58 to allow the non-condensible gases 12 to be removed from the system.

The housing 34 is sized to receive the membrane material 36. The housing 34 may comprise any of a wide range of shapes and configurations suitable for holding the membrane 36 and for defining the inlet or upstream side 50 and the outlet or downstream side 48. Accordingly, the present invention should not be regarded as limited to a housing 34 having any particular shape or configuration. However, by way of example, in one preferred embodiment, the housing 34 may comprise a generally cylindrically shaped configuration suitable for receiving a spiral-wound membrane 36. As is shown schematically in FIG. 1, the membrane material 36 divides the housing 34 into the upstream side 50 and the downstream side 48. Since housings for receiving spiral-wound type membranes are known in the art and are readily commercially available, the housing configuration utilized in one preferred embodiment of the present invention will not be described in further detail herein.

The housing 34 may be fabricated from any of a wide range of materials suitable for the intended application and the particular working fluid involved. Consequently, the housing 34 should not be regarded as being limited to any particular material. By way of example, in one preferred embodiment, the housing 34 is fabricated from stainless steel.

The membrane material 36 contained in the housing 34 may comprise any of a wide range of membrane materials now known in the art or that may be developed in the future that are or would be suitable for the intended application and for use with the particular working fluid utilized in the system. As mentioned above, in one preferred embodiment of the present invention, the membrane material 36 is in the form of a spiral-wound membrane, although other membrane configurations are possible and could be utilized, as would be obvious to persons having ordinary skill in the art after having become familiar with the teachings of the present invention. Consequently, the present invention should not be regarded as limited to use with membrane materials having any particular configuration.

The membrane material 36 may be selected so that it preferentially passes either the working fluid 14 or the particular constituents expected to comprise the non-condensible gas 12 that is to be removed from the working fluid. Accordingly, the membrane 36 should not be regarded as limited to any particular material. However, by way of example, in one preferred embodiment wherein the working fluid 14 comprises a volatile organic compound (e.g., isobutane or isopentane) and wherein the expected non-condensible gases 12 comprise primarily air, the membrane material 36 comprises polydimethylsiloxane (PDMS), which is well-known in the art and is readily commercially available in a form suitable for forming the membrane material 36. The membrane material 36 comprising polydimethylsiloxane preferentially passes the VOC working fluid 14, but does not preferentially pass air and nitrogen, the primary constituents of air, which is typically expected to comprise a major portion of the non-condensible gases 12.

The pump 42 connected between the permeate outlet 52 of the housing 34 and the condenser system 28 may comprise any of a wide range of pumps now known in the art or that may be developed in the future that are or would be suitable for use in the intended application and for the particular working fluid involved. Consequently, the present invention should not be regarded as limited to any particular type of pump. However, by way of example, in one preferred embodiment, the pump 42 may comprise a vacuum pump suitable for pumping the working fluid 14 in a vapor state.

The apparatus 10 according to the present invention may be operated as follows to remove non-condensible gases 12 from the working fluid 14. Assuming that the geothermal power generation system 16 in which the system 10 being used has reached steady state operation, the working fluid 14 enters the vapor generator system 20 as a liquid. Hot brine 18 flowing through the vapor generator 20 heats and ultimately vaporizes the working fluid 14. The vaporized working fluid 14 is then discharged from the vapor generator 20 as a vaporized working fluid stream 24. Depending on the particular system, the vaporized working fluid stream may exit the vapor generator system 20 at a quality of about 100% or may be superheated to a temperature in excess of the saturation temperature of the working fluid 14 at the discharge pressure of the vapor generator 20. In any event, the vaporized working fluid stream 24 is directed to the energy conversion device, e.g., the turbine 22, which converts into useful work some of the heat energy contained in the vaporized working fluid stream 24. In the application shown and described herein, the turbine 22 is operatively associated with a generator system 26 which converts the rotational energy of the turbine 22 into electrical energy.

After being expanded in the turbine assembly 22, the working fluid 14 exits the turbine 22 as an exhaust stream 30. Generally speaking, the exhaust stream 30 discharged by the turbine system 22 will comprise a superheated vapor. That is, the working fluid 14 will be in the vapor state. Alternatively, the working fluid 14 exiting the turbine assembly 22 could be in the wet mixture state. That is, the working fluid 14 discharged by the turbine system 22 will be at a quality less than 100%. In any event, the working fluid exhaust stream 30 enters the condenser system 28 which condenses the working fluid 14. Thereafter, the pump 32 receives the now liquefied working fluid 14, increases its pressure, and returns the liquefied working fluid 14 to the vapor generator system 20, whereupon the cycle is repeated.

While the turbine exhaust stream 30 is in the condenser 28, a portion of the working fluid 14 is drawn from the condenser system 28 by the apparatus 10 as the NCG-laden working fluid stream 38. As mentioned above, it is generally preferred that the portion of the working fluid 14 drawn from the condenser system 28 primarily in the vapor state, in that the membrane material 36 generally functions more efficiently with materials in the vapor state. Alternatively, if the working fluid 14 is drawn from the condenser system 28 in the wet mixture state (i.e., at a quality less than 100%), then it will be preferable to separate the vapor fraction from the liquid fraction before directing the vapor fraction to the membrane material 36. Such a separation could be effected by means of a moisture separator (not shown) positioned between the condenser system 28 and the membrane material 36. However, since such moisture separator systems are well-known in the art and could be easily provided by persons having ordinary skill in the art after having become familiar with the teachings of the present invention, the moisture separator which may be utilized, if desired or required, will not be discussed in further detail herein.

The NCG-laden working fluid stream 38 entering the housing 34 comprises working fluid 14 in the vapor state as well as quantities of non-condensible gases (NCGs) 12. As mentioned above, the NCG-laden working fluid stream 38 is caused to be drawn from the condenser system 28 by the action of the pump 42 which lowers the pressure on the downstream or outlet side 48 of the housing 34. Accordingly, the NCG-laden working fluid stream 38 drawn from the condenser system 28 enters the upstream or inlet side 50 of the housing 34, where the NCG-laden working fluid contacts the membrane 36. Since, in the embodiment shown and described herein, the membrane 36 preferentially passes the working fluid 14, substantial quantities of the working fluid 14 contained in the NCG-laden working fluid stream 38 pass through the membrane 36, forming the "purified" or working fluid-rich permeate 40 within the downstream or outlet side 48 of housing 34. It should be understood that the working fluid permeate 40 will typically comprise residual amounts of non-condensible gases 12. The pump 42 returns the permeate 40 to the condenser system 28. Thereafter, the working fluid 14 comprising the permeate 40 is ultimately condensed and returned to the system 16.

The non-condensible gases 12 contained in the NCG-laden working fluid stream 38 tend to remain on the upstream or inlet side 50 of the housing 34, forming a retentate 46. The non-condensible gases 12 comprising the retentate 46 are then discharged from the upstream side 50 of housing 34. As a practical matter, the retentate 46 will comprise some residual amounts of working fluid 14 in addition to the non-condensible gases 12. While the residual amount of working fluid 14 contained in the retentate 46 depends on a variety of factors, it is strongly related to the membrane area to which it is exposed as well as on the time the NCG-laden working fluid stream 38 remains in contact with the membrane 36. If the residual amount of working fluid is higher than desired or required in a particular application, the membrane area and/or residence time in the upstream end 50 may be increased. Alternatively, the pressure differential across the membrane 36 may be increased such as, for example, by increasing the flow rate provided by the pump 42. Conversely, if higher residual amounts of working fluid 14 in the retentate 46 can be tolerated, the membrane area and/or residence time may be decreased. Alternatively, the pressure differential across the membrane 36 may be decreased.

For example, in one preferred embodiment involving a 4 megawatt geothermal power generation system 16, a membrane area of 0.4 $m^2$ and a pump 42 having an input power of about 60 watts, resulted in a retentate 46 comprising a 50:50 mixture (volume basis) of working fluid 14 and non-condensible gas 12. Increasing the membrane area to 0.6 $m^2$ and increasing the pump power to about 75 watts reduced the amount of working fluid 14 in the retentate 46 to about 20% (volume basis).

Another way to recover additional amounts of working fluid 14 from the NCG-laden stream 38 is to add a second membrane to the system. For example, with reference now to FIG. 2, a second embodiment 110 of the apparatus for separating non-condensible gases 112 from a working fluid 114 comprises a first membrane housing or module 136 and a second membrane housing or module 136'. As was the case for the first embodiment 10, the second embodiment 110 may comprise a portion of a geothermal power generation system 116 in which heat energy contained in geothermal brine 118 is transferred to the working fluid 114 in a vapor generator system 120. The vapor generator system 120 produces a vaporized working fluid stream 124 which is then expanded in a turbine system 122. The turbine system 122 is operatively associated with a generator system 126 which converts into electrical energy the mechanical energy of the rotating turbine system 122. A working fluid exhaust stream 130 exiting the turbine system 122 enters a condenser system 128 which condenses the working fluid exhaust stream 130. A pump 132 returns to the vapor generator system 120 liquefied working fluid 114 from the condenser system 128.

Figure 2:
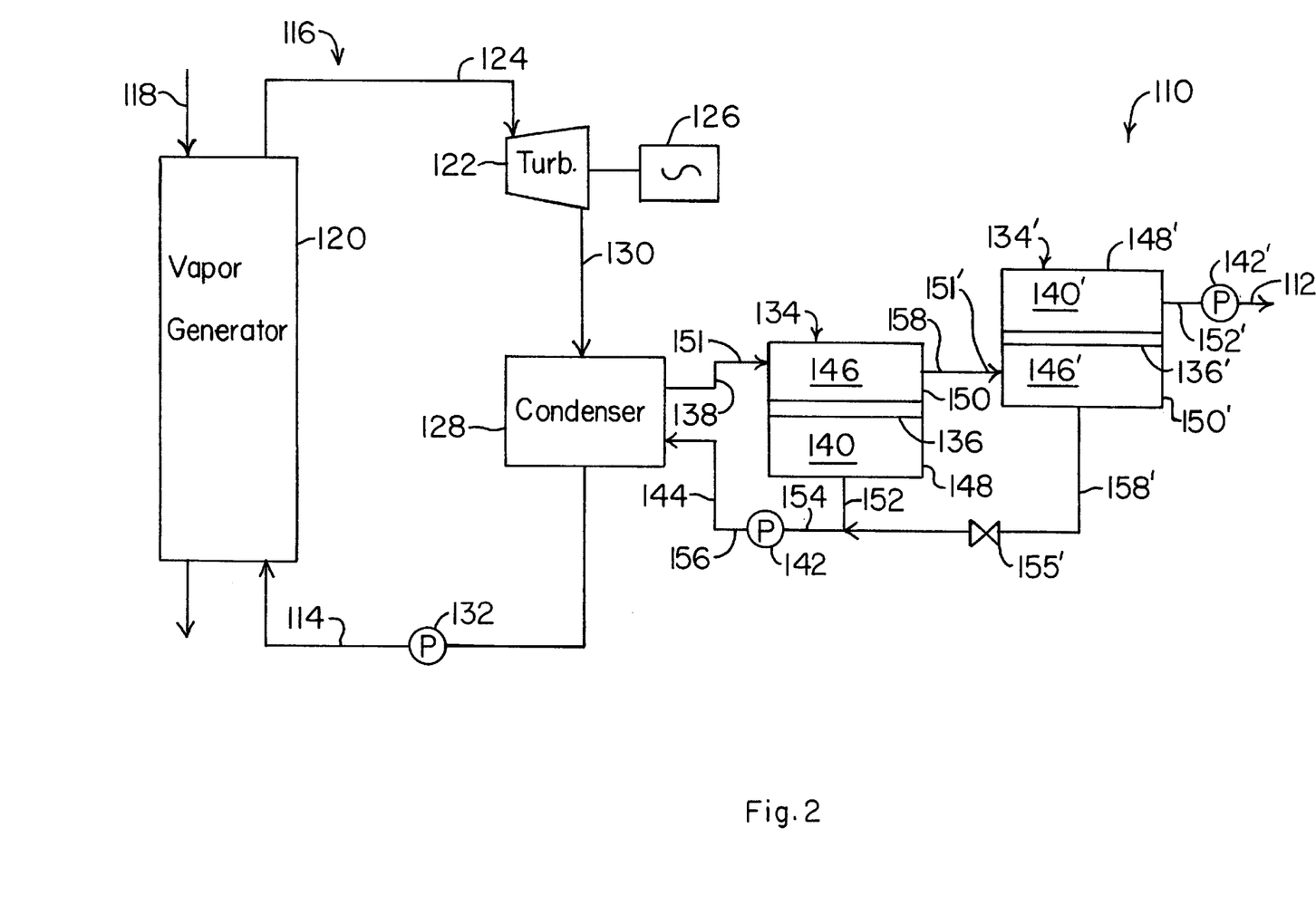
FIG. 2 is a schematic representation of a second embodiment of the apparatus for removing non-condensible vapors as it could be used in conjunction with a binary geothermal power generation system.

As was the case for the first embodiment described above, the apparatus 110 of the second embodiment is also operatively associated with the condenser system 128 of the geothermal power system 116, although this is not required. More specifically, the second embodiment 110 comprises a first housing or module 134 having an inlet 151, a permeate outlet 152, and a retentate outlet 158. The inlet 151 is connected to the condenser system 128 so that the first housing or module 134 receives a portion of the working fluid 114 contained in the condenser system 128 as an NCG-laden working fluid stream 138. The permeate outlet 152 of first housing 134 is connected to the inlet 154 of pump 142. The outlet 156 of pump 142 is connected to the condenser system 128 and returns a purified working fluid stream 144 to the condenser system 128. The retentate outlet 158 is connected to the second housing or module 134' in the manner that will be described in greater detail below.

The first housing 134 is configured to receive a first membrane 136 so that the first membrane 136 divides the first housing 134 into a downstream or outlet side 148 and an upstream or inlet side 150. In the embodiment shown and described herein, the membrane 136 preferentially passes the working fluid 114. Alternatively, the membrane 136 may be selected so that it preferentially passes the non-condensible gases 112 expected to accumulate in the working fluid 114. By way of example, in one preferred embodiment wherein the working fluid 114 comprises a volatile organic compound (e.g., isobutane or isopentane) and wherein the expected non-condensible gases 112 comprise primarily air, the membrane material 136 comprises polydimethylsiloxane (PDMS), which is well-known in the art and is readily commercially available in a form suitable for forming the membrane material 136. The membrane material 136 comprising polydimethylsiloxane preferentially passes the VOC working fluid 114, but does not preferentially pass air and nitrogen, the primary constituents of air, which is typically expected to comprise a major portion of the non-condensible gases 112.

The second housing or module 134' is provided with an inlet 151', a permeate outlet 152', and a retentate outlet 158'. The inlet 151' is connected to the retentate outlet 158 of the first housing or module 134. The permeate outlet 152' is connected to a pump 142', whereas the retentate outlet 158' is connected to the inlet 154 of pump 142 via an expansion valve assembly 155'.

The second housing 134' is configured to receive a second membrane 136' so that the second membrane 136' divides the second housing 134' into a downstream or outlet side 148' and an upstream or inlet side 150'. In the embodiment shown and described herein, the second membrane 136' preferentially passes the non-condensible gases 112, not the working fluid 114. Alternatively, the second membrane 136' may be selected so that it preferentially passes the working fluid 114. By way of example, in one preferred embodiment wherein the working fluid 114 comprises a volatile organic compound (e.g., isobutane or isopentane) and wherein the expected non-condensible gases 112 comprise primarily air, the membrane material 136' comprises a glassy polymer membrane available from Membrane Technology and Research of Menlo Park, Calif., under the trademark "Hyflon." The second membrane 136' comprising the Hyflon material preferentially passes air and nitrogen, the primary constituents of air, which is typically expected to comprise a major portion of the non-condensible gases 112. As an aside, it should be noted that "rubbery"-type polymers generally preferentially pass VOCs, whereas "glassy"-type polymers generally pass the constituents of air (e.g., nitrogen and oxygen).

The second embodiment 110 may be operated as follows to remove non-condensible gases 112 from the working fluid 114. While the turbine exhaust stream 130 is in the condenser 128, a portion of the working fluid 114 (preferably in the vapor state) is removed from the condenser system 128 by the apparatus 110 as the NCG-laden working fluid stream 138. The NCG-laden working fluid stream 138 comprises working fluid 114 as well as quantities of non-condensible gases (NCGs) 112. The NCG-laden working fluid stream 138 is caused to be drawn from the condenser system 128 by the actions of the pumps 142 and 142' which lower the pressure on the downstream or outlet sides 148 and 148' of the two modules or housings 134 and 134'.

The NCG-laden working fluid stream 138 drawn from the condenser system 128 enters the upstream or inlet side 150 of the first housing 134, where the NCG-laden working fluid contacts the first membrane 136. Since, in the embodiment shown and described herein, the first membrane 136 preferentially passes the working fluid 114, substantial quantities of the working fluid 114 contained in the NCG-laden working fluid stream 138 pass through the first membrane 136 and form a working fluid-rich permeate 140 within the downstream or outlet side 148 of first housing 134. As explained above, the permeate 140 will typically contain residual amounts of NCGs 112. The pump 142 returns the permeate 140 to the condenser system 128. Thereafter, the working fluid 114 comprising the permeate 140 is ultimately condensed and returned to the system 116.

The non-condensible gases 112 contained in the NCG-laden working fluid stream 138 remain on the upstream or inlet side 150 of the first housing 134, forming a retentate 146. The non-condensible gases 112 comprising the retentate 146 are then discharged from the upstream side 150 of housing 134 via the retentate outlet 158. As a practical matter, the retentate 146 will comprise some residual amounts of working fluid 114 in addition to the non-condensible gases 112.

A substantial portion of the residual amounts of working fluid 114 comprising the retentate 146 are removed by the second membrane 136'. More specifically, the retentate 146 from the first housing or module 134 is conducted to the upstream end 150' of the second housing or module 134' via the inlet 151'. Since the second membrane 136' preferentially passes the constituents of the expected non-condensible gases 112 (e.g., air), substantial quantities of the non-condensible gases 112 contained in the retentate 146 pass through the second membrane 136' and form an NCG-rich permeate 140' within the downstream or outlet side 148' of second housing 134'. As a practical matter, the NCG-rich permeate 140' will contain residual amounts of the working fluid 114. The pump 142' removes the NCG-rich permeate 140' from the downstream side 148' of the second housing 134'. Thereafter, the NCG-rich permeate 140' may be collected or vented to the atmosphere, as the case may be.

The working fluid 114 contained in the retentate 146 from the first housing 134 remains on the upstream or inlet side 150' of the second housing 134', forming a working fluid-rich retentate 146'. As a practical matter, the working fluid-rich retentate 146' will contain residual amounts of NCGs 112. The working fluid-rich retentate 146' is removed from the upstream side 150' of the second housing 134' by the pump 142 via the expansion valve 155'. The working fluid-rich retentate 146' is combined with the working fluid-rich permeate 140 from the first module or housing 134. The combination is thereafter returned to the condenser system 128 to be re-condensed in the manner already described.

As was the case for the first embodiment described above, the residual amount of working fluid 114 contained in the retentate 146 (from the first module 134) and permeate 140' (from the second module 134') depends on a variety of factors, including the membrane area to which it is exposed as well as on the time the NCG-laden working fluid streams remain in contact with the first and second membranes 136 and 136'. If the residual amount of working fluid is higher than desired or required in a particular application, the membrane area and/or residence time in each module may be increased. Alternatively, the pressure differentials across the membranes 136 and 136' may be increased such as, for example, by increasing the flow rates provided by the pumps 142 and 142'. Conversely, if higher residual amounts of working fluid 114 in the retentate 146 and permeate 140' can be tolerated, the membrane areas and/or residence times may be decreased. Alternatively, the pressure differentials across the membranes may be decreased.

For example, in an embodiment involving a 4 megawatt geothermal power generation system 116, a membrane area of 0.4 m$^2$ (for each membrane) and a total pump power (for both pumps) of about 150 watts result in a permeate 140' comprising a 50:50 mixture (volume basis) of working fluid 114 and non-condensible gas 112. Increasing the membrane area to 1.4 m$^2$ (for the first membrane 136) and to 0.3 m$^2$ (for the second membrane 136') and increasing the total pump power (both pumps) to about 223 watts reduced the amount of working fluid 114 in the permeate 140' to about 20% (volume basis).

This completes the discussion of the preferred embodiments of the method and apparatus for removing NCGs according to the present invention. While a number of specific components are described herein for the preferred embodiments of the present invention, persons having ordinary skill in the art will readily recognize that other substitute components or combinations of components may be available now or in the future to accomplish comparable functions to the various components shown and described herein. For example, while the membrane materials shown and described herein comprise spiral-wound type configurations, other configurations are known and could be substituted for the spiral-wound membrane configurations. Also, while the second embodiment 10 is shown and described herein comprises two membrane separation stages, additional membrane separation stages could be added to further reduce the amount of working fluid retained in the NCGs being removed. Such multi-stage systems could comprise any of a wide range of membrane materials (e.g., those that preferentially pass the working fluid and those that preferentially pass the NCGs) arranged in any of a wide range of configurations.

In summary then, it is contemplated that the inventive concepts herein described may be variously otherwise embodied and it is intended that the appended claims be construed to include alternative embodiments of the invention except insofar as limited by the prior art.

We claim:

1. A method for removing non-condensible gas from a working fluid utilized in a thermodynamic system, comprising:
    a) using a vapor generator to vaporize the working fluid;
    b) directing the vaporized working fluid to an energy conversion device, the energy conversion device converting into useful work heat energy contained in the vaporized working fluid;
    c) condensing the vaporized working fluid to form a condensed working fluid;
    d) returning the condensed working fluid to the vapor generator;
    e) while performing steps a–d, drawing-off a portion of the working fluid from the thermodynamic system;
    f) separating non-condensible gas from the portion of the working fluid drawn-off from the thermodynamic system; and
    g) returning to the thermodynamic system working fluid separated from the non-condensible gas.

2. The method of claim 1, wherein the step of separating the non-condensible gas from the working fluid comprises contacting with a first membrane a portion of the vaporized working fluid, said first membrane separating the non-condensible gas from the working fluid in the vapor state.

3. The method of claim 2, further comprising:
    contacting with a second membrane the non-condensible gas from the first membrane, the second membrane separating additional amounts of non-condensible gas and working fluid from the non-condensible gas from the first membrane; and
    returning to the thermodynamic system the additional amounts of working fluid separated by the second membrane.

4. Apparatus, comprising:
    a thermodynamic system, comprising:
        a working fluid;
        a vapor generator, said vapor generator vaporizing said working fluid;
        an energy conversion device operatively associated with said vapor generator, said energy conversion device receiving vaporized working fluid from said vapor generator, said energy conversion device converting into useful work heat energy contained in the vaporized working fluid; and
        a condenser operatively associated with said energy conversion device and said vapor generator, said condenser condensing working fluid from said energy conversion device and returning condensed working fluid to said vapor generator;
    a first membrane having an upstream side operatively connected to the thermodynamic system so that said upstream side of said first membrane receives a portion of the working fluid, said first membrane separating non-condensible gas from the working fluid; and
    a first pump operatively associated with said first membrane, said first pump causing the portion of the working fluid to contact said first membrane so that said first membrane separates non-condensible gas from the working fluid and returns purified working fluid to the thermodynamic system.

5. The apparatus of claim 4, wherein said first membrane preferentially passes the working fluid so that said non-condensible gas comprises a retentate and so that said working fluid comprises a permeate.

6. The apparatus of claim 5, wherein said first pump is positioned between a downstream side of said first membrane and the thermodynamic system, said first pump receiving the working fluid permeate from said first membrane and returning the working fluid permeate to the thermodynamic system.

7. The apparatus of claim 6, further comprising a second membrane having an upstream side operatively associated with said first membrane so that the upstream side of said second membrane receives the non-condensible gas retentate from said first membrane, said second membrane separating additional amounts of working fluid and non-condensible gas from the non-condensible gas retentate from said first membrane.

8. The apparatus of claim 7, wherein said second membrane preferentially passes the non-condensible gas so that additional amounts of working fluid comprise a retentate and so that additional amounts of non-condensible gas comprise a permeate.

9. The apparatus of claim 8, further comprising a second pump operatively associated with said second membrane, said second pump receiving the non-condensible gas permeate from said second membrane.

10. The apparatus of claim 4, wherein said membrane preferentially passes the non-condensible gas so that said working fluid comprises a retentate and so that said non-condensible gas comprises a permeate.

11. The apparatus of claim 10, wherein said first pump is operatively between a downstream side of said first membrane, said first pump receiving the non-condensible gas permeate from said first membrane.

12. A thermodynamic system for converting into useful work heat energy contained in a heat source, comprising:
    a working fluid operatively associated with the heat source, the working fluid absorbing heat energy from said heat source to form a vaporized working fluid;
    an energy conversion device, said energy conversion device receiving the vaporized working fluid, said energy conversion device converting into useful work heat energy contained in said vaporized working fluid, said energy conversion device producing an exhaust stream comprising the working fluid; and
    a first membrane in fluid communication with the exhaust stream of said energy conversion device, said first membrane receiving a portion of the working fluid in a vapor state, said first membrane separating non-condensible gas from the working fluid in the vapor state, and returning to said thermodynamic system working fluid lacking substantial amounts of non-condensible gas.

13. The system of claim 12, wherein said first membrane preferentially passes the working fluid so that said non-condensible gas comprises a retentate and so that said working fluid comprises a permeate.

14. The system of claim 13, further comprising a first pump positioned between a downstream side of said first membrane and the thermodynamic system, said first pump receiving the working fluid permeate from said first membrane and returning to the thermodynamic system the working fluid permeate.

15. The system of claim 14, further comprising a second membrane having an upstream side operatively associated with said first membrane so that the upstream side of said second membrane receives the non-condensible gas retentate from said first membrane, said second membrane separating additional amounts of working fluid and non-condensible gas from the non-condensible gas retentate from said first membrane.

16. The system of claim 15, wherein said second membrane preferentially passes the non-condensible gas so that additional amounts of working fluid comprise a retentate and so that additional amounts of non-condensible gas comprise a permeate.

17. The system of claim 16, further comprising a second pump operatively associated with said second membrane, said second pump receiving the non-condensible gas permeate from said second membrane.

18. The system of claim 12, wherein said working fluid is selected from the group consisting of isobutane and isopentane and wherein said first membrane comprises polydimethylsiloxane.

19. Apparatus for removing non-condensible gas from a working fluid utilized in a thermodynamic system, comprising:

working fluid extraction means for extracting from the thermodynamic system a portion of the working fluid in a vapor state separating means operatively associated with said working fluid extraction means for separating the non-condensible gas from the working fluid in the vapor state; and return means operatively associated with said separating means for returning to the thermodynamic system working fluid separated by said separating means.

20. The apparatus of claim 19, wherein said separating means comprises permeable membrane means for preferentially passing the working fluid so that the non-condensible gas comprises a retentate and so that the working fluid comprises a permeate.

21. The apparatus of claim 19, wherein said separating means comprises permeable membrane means for preferentially passing the non-condensible gas so that the working fluid comprises a retentate and so that the non-condensible gas comprises a permeate.

* * * * *